3,172,808
METHOD OF TREATING WOUNDS

Heinz Baumann and Hubertus Schmidt, Frankenthal, Pfalz, Germany, assignors to Chemische Fabrik Frankenthal H. Schmidt K.G., Frankenthal, Pfalz, Germany, a company of Germany
No Drawing. Filed Feb. 11, 1960, Ser. No. 8,194
Claims priority, application Germany, Feb. 12, 1959, B 52,087; Nov. 27, 1959, B 55,703
4 Claims. (Cl. 167—58)

This invention relates to a method of treating wounds, and more particularly to the treating of wounds by applying to the surface of a wound a synthetic resin in foamy condition.

Certain synthetic resins, when in foamy condition, may advantageously be used as wound dressing material. They may be applied to wounds in concrete form, for instance, as pads, or in loose form, for instance, as flakes, fibers, powders, or the like. The plastic foams are auto-sterile and give considerable relief or comfort when applied to wounds, directly or indirectly. They are highly absorptive and have a self-healing effect. Also, they are kind to the tissue and are resorbed by the organism.

Our present invention aims at an improved method of treating wounds by means of synthetic resins in foamy conditions. The objects of the invention will be apparent from the following description.

We have found that urea formaldehyde resins, melamine formaldehyde resins, and mixtures thereof are best suited for our purposes. The referred to resins are used according to the invention in the form of a generally self-hardening foam.

Since the surgical dressings used according to the invention contain everything that is required for a quick healing process, including sterile air, it is important that the dressing will always touch all parts of the wound. Although this may easily be attained with powders and flakes, a layer of such loose material can only be very thin since any excess of powder or flocculent material is bound to fall off or be blown off. Also, if powdery or flaky dressing material is partly used up due to resorption, gaps may appear in the covering of the wound. On the other hand, dressing material in the form of pads or webbing is often too stiff to be closely in touch with a wound at all points thereof.

The invention provides to apply the foamy resinous material, when used in the form of pads or webbing, to a wound before it permanently hardens.

Where the dressing material, again when used as pads or webbing, is too stiff, such deficiency may also be overcome by applying the resins in the form of a foam which is of a slowly hardening type and will, after being applied, be self-sustaining and at the same time moldable.

Such self-sustaining and moldable resinous foam may be supported by a perforated foil or a wide-mesh fabric, for example, gauze, which may be charged with medicaments which are suitable for the treatment of wounds. The moldable resinous foam may also be covered by a thin flexible layer which, if desired, may be adhesive at one side. Such a covering layer forms a smooth outer surface and may be permeable to liquids, for example, by being perforated, to permit suitable solutions or moist treating materials of any kind to penetrate to the plastic foam and even through the latter to the wound.

It is thus possible to supply a special solidifying agent or any solution which is to come into contact with the wound through such a permeable cover to the foam layer. The foam of synthetic resins is to a certain extent absorbent and permeable and can therefore be saturated with a solution which will be released slowly and will, because of the inherent aseptic properties of the resinous foam, be reliably sterile to the wound or to the body.

It has been found, according to another aspect of the invention, to be advantageous to cover the dressing material with a film-forming substance. In accordance with this embodiment of the method of our invention, foamy pads or webs of the synthetic resin used are moistened at one or both sides with an aqueous solution of a film-forming agent. If the dressing material is used in pulverulent or flaky form, it is sprayed with such solution. Due to the fact that the film is only subsequently formed on the surface of the body of the resinous material, it will be very intimately combined therewith. It is thus possible to attain a porous film which increases the mechanical solidity and flexibility of a pad or webbing considerably.

If a tough film is thus applied to the body of the foamy material, the flexibility thereof will be improved to such an extent that it may be bent about the smallest possible radius without being damaged and without impairing the porosity of the respective dressing material. It will always remain absorbent for wound secretions and permeable to air.

Such a porous film covering produces even in a pulverulent or flocculent dressing material an occlusion of air and a better adhesion to the skin, both of which aid in a healing process.

The films to be used as coatings may be of any known material and may be produced from their solutions or their dissolved components, for example, films of cellulose or plastic.

The coating may be applied in several layers which may also consist of different film-forming substances.

For producing bandages or paddings according to this embodiment of the invention, the film-forming substance may be applied upon the pad or webbing, for example, by rolling it thereon under pressure. By the same rolling process the pad or webbing may also be compressed and solidified.

The resins used according to the invention are produced, for instance, by bringing a solution of a precondensate of the respective resin into a foaming condition by means of a foaming agent or air in the presence of a catalyst or a hardening agent. The resinous foam is then molded into a body of flat shape and this body is thereafter compressed to about half its former thickness. By such compression of the foam body, it becomes more solid without, however, losing its flexibility. The inherent flexibility of the material may even be increased by providing the foam body with grooves, for example, longitudinal or transverse grooves or both.

Of course, the foaming of the synthetic resin may also be carried out during its production by means of propellants, that is, by the addition of gas-forming mixtures to the crude synthetic resins.

The substances which are suitable for wound treatment are preferably added to the precondensate solution of the resins.

The production of the dressing material may be carried out continuously in such a manner that foam is produced in a continuous operation in a closed vessel from a solution of a foaming agent and compressed air, and such foam is then passed under pressure from that vessel into a mixing chamber where it is mixed with a resinous precondensate solution. The outlet of this mixing chamber, which is otherwise closed, consists of a wide nozzle through which the resinous foam emerges as a continuous wide foam ribbon. This moving foam ribbon may then be compressed by rollers to about one-half of its former thickness. In this operation it is also possible to mix the catalyst or hardening agent for the resinous precondensate into the solution of the foaming agent, while the solution of the precondensate may contain additional substances, for example, such as are of special advantage for wound treatment, for example, astringents such as alum or ferric chloride.

It is generally advisable to discharge the mixture of foam and synthetic resin from the mixing chamber by means of compressed air. Usually the air pressure existing within the foam-generating chamber will be sufficient for that purpose, particularly since the resinous precondensate solution must be passed to the mixing chamber under pressure.

The foam ribbon emerging from the wide nozzle of the mixing chamber cannot be subjected to a drying treatment until it has been rolled out.

The method of production of foamy condensation products, as described hereinbefore, is especially applicable to urea formaldehyde resins.

If the formation of the final stage of the synthetic resin requires the application of higher temperatures or makes such an application desirable, it is advisable to produce the resinous foam in the form of blocks or plates and to cut them subsequently to the desired lengths, widths, and thicknesses. It is thus possible to produce thin, unpressed or compressed resinous foam plates or strips of any desired thickness and, if desired, to provide them at one or both sides with a coating or foil, for example, of cellulose or plastic.

More specifically, the production of the dressing material is carried out as follows:

A sulphonate solution, for example, a solution of a fatty alcohol sulphonate of sodium or a sodium lauryl sulphonate solution is used to produce a foam by means of air or oxygen. The solution is then mixed with a precondensate of a urea formaldehyde resin. For example, a solution of the precondensate is mixed into the foam. A reaction accelerator for the precondensate, for example, phosphoric acid or oxalic acid, may be added to the solution of the foaming agent. The amount of reaction accelerator to be applied depends upon whether the synthetic resin is to harden quickly or slowly.

A moldable plastic foam may be freshly prepared and sprayed by means of a spraying apparatus upon a wound or the like to cover the same. We use, for instance, a spraying apparatus which is easily manipulated by hand and comprises a container for the solution of the resinous precondensate, a second container for the solution of the foaming agent and a reaction accelerator for the resinous precondensate, an exchangeable container for the compressed air or oxygen, a foaming apparatus with a mixing chamber connected thereto which is provided with a foam discharge nozzle, and connecting conduits leading from the compressed gas container to the solution containers and to the foaming apparatus and from the container for the solution of foaming agent to the foaming apparatus, as well as from the container for the precondensate solution to the mixing chamber. The conduit for the precondensate solution may terminate in the mixing chamber by means of a mixing nozzle. Furthermore, the various conduits are provided with control and shut-off valves. Such an apparatus may be used for spraying the foam by means of the compressed gas which is used for producing the foam.

Flakes of the dressing material may be produced as follows:

At the discharge opening of a spraying apparatus from which the resinous foam would otherwise emerge as a creamy mass, compressed air is supplied to the emerging resinous foam whereby the foam is disintegrated into flakes.

A resinous foam made into thick plates or blocks is cut into the desired shape after hardening and drying. The surfaces of the pieces attained may be lightly coated with a liquid or pulverulent paper adhesive and then covered with a layer of thin, perforated or unperforated paper.

A foam of synthetic resin which is produced without any foreign additions may, after hardening, be subsequently charged, for example, with astringent substances by immersing it, for example, into a 10% watery solution of alum or ferric chloride, and by removing it then from the solution after being fully saturated therewith, and drying it. Thereafter the foamy resinous body is cut, and the cut portions may, if desired, be coated with foils in such a manner that they may again be pulled off.

If the dressing material should be pulverulent, the last-mentioned products without covering foils are ground into a powder.

In order to provide foamy bodies with porous coatings, they may be treated as follows:

*Example 1*

Foamy bodies of a size of ½ m.$^2$ and a thickness of 2 cm. are sprayed with a solution of 450 g. of polyvinyl propionate in 550 g. of water and are then dried in a drying chamber at a temperature of about 50° C., and then cut into suitable sizes.

*Example 2*

The operation is carried out as in Example 1, except for the fact that before drying the foamy body, 400 g. of plastic fibers are shaken upon and into the same and are then smoothed out with a soft long-haired brush.

*Example 3*

The operation is carried out as in Example 1, except for the fact that a spraying solution is used to which 400 cm.$^3$ of long mull fibers of a length of 1 to 2 mm. are added under considerable stirring.

Flakes and powders may be blown through a mixing chamber into which the coating solution is sprayed. The same proportions of resinous foam and solution are then applied as stated in Example 1.

Although our invention has been illustrated and described with reference to the preferred embodiments thereof, we wish to have it understood that it is in no way limited to the details of such embodiments or to the specific examples described, but is capable of numerous modifications within the scope of the appended claims.

Having thus fully disclosed our invention, what we claim is:

1. A method of treating wounds, comprising applying to the surface of a wound a synthetic resin in foamy condition, the resin being selected from the group consisting of urea formaldehyde, melamine formaldehyde, and mixtures thereof, said application to the wound being carried out before said foamy resinous material is permanently hardened.

2. A method of treating wounds, comprising applying to the surface of a wound a synthetic resin in foamy condition, the resin being selected from the group consisting of urea formaldehyde, melamine formaldehyde, and mixtures thereof, said application to the wound being carried out while said foamy resinous material is moldable and of self-sustaining shape.

3. A method of treating wounds, comprising applying to the surface of a wound a synthetic resin in foamy condition, the resin being selected from the group consisting of urea formaldehyde, melamine formaldehyde, and mixtures thereof, applying, prior to said application to the wound, a film-forming agent to at least one side of said foamy resinous material, and allowing said agent to form a film, any side of said foamy resinous material being used for said application to the wound.

4. A method of treating wounds, comprising applying to the surface of a wound a synthetic resin in foamy condition, the resin being selected from the group consisting of urea formaldehyde, melamine formaldehyde, and mixtures thereof, said foamy resinous material being used for said application to the wound in a flat form provided at least on one side with at least a single backing layer.

(References on following page)

References Cited in the file of this patent

UNITED STATES PATENTS

| | | |
|---|---|---|
| 1,370,081 | Baker | May 11, 1921 |
| 2,273,367 | Meyer | Feb. 17, 1942 |
| 2,376,653 | Boyer | May 22, 1945 |
| 2,378,322 | Peterson | June 12, 1945 |
| 2,384,387 | Meyer | Sept. 4, 1945 |
| 2,516,295 | Borton | July 25, 1950 |
| 2,610,171 | Nyquist | Sept. 9, 1952 |
| 2,735,426 | Claydon | Feb. 21, 1956 |
| 2,737,179 | Dahle | Mar. 6, 1956 |
| 2,804,073 | Gallienne | Aug. 27, 1957 |
| 2,858,830 | Robins | Nov. 4, 1958 |
| 2,887,725 | Vickers | May 26, 1959 |
| 2,972,545 | Briskin | Feb. 21, 1961 |

FOREIGN PATENTS

| | | |
|---|---|---|
| 776,408 | Great Britain | June 5, 1957 |

OTHER REFERENCES

Translation of German article (reprint), "The Suitability and Application of Novel Powder Bases," by H. von Czetsch-Lindenwald, in Die Pharmazeutische Industrie, 18, 1956, pp. 133–136 (reprint pp. 1–12).

Graf et al. (German printed application), 1,007,025, Apr. 25, 1957.